United States Patent
Kang et al.

(10) Patent No.: US 10,382,108 B2
(45) Date of Patent: Aug. 13, 2019

(54) METHOD AND DEVICE FOR CONFIGURING AND DETERMINING CODE SUPERPOSITION-BASED MULTIUSER ENCODING MODE

(71) Applicant: CHINA ACADEMY OF TELECOMMUNICATIONS TECHNOLOGY, Beijing (CN)

(72) Inventors: Shaoli Kang, Beijing (CN); Fei Qin, Beijing (CN); Xiaoming Dai, Beijing (CN); Ying Peng, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 46 days.

(21) Appl. No.: 15/531,363

(22) PCT Filed: Nov. 18, 2015

(86) PCT No.: PCT/CN2015/094938
§ 371 (c)(1),
(2) Date: May 26, 2017

(87) PCT Pub. No.: WO2016/095647
PCT Pub. Date: Jun. 23, 2016

(65) Prior Publication Data
US 2018/0302134 A1    Oct. 18, 2018

(30) Foreign Application Priority Data
Dec. 16, 2014    (CN) .......................... 2014 1 0784398

(51) Int. Cl.
*H04B 7/04*    (2017.01)
*H04B 7/0456*    (2017.01)
(Continued)

(52) U.S. Cl.
CPC ......... *H04B 7/0465* (2013.01); *H04B 7/0486* (2013.01); *H04J 13/16* (2013.01); *H04W 72/0473* (2013.01); *H04J 11/0026* (2013.01)

(58) Field of Classification Search
CPC ............... H04B 7/0465; H04B 7/0486; H04W 72/0473; H04J 11/0026
See application file for complete search history.

(56) References Cited

U.S. PATENT DOCUMENTS

2003/0152022 A1*  8/2003  Hosur ................. H04L 27/2602
                                                    370/208
2004/0137951 A1*  7/2004  Hwang ................. H04L 1/0662
                                                    455/562.1
(Continued)

FOREIGN PATENT DOCUMENTS

CN    101138163 A    3/2008
CN    101594207 A    12/2009

OTHER PUBLICATIONS

International Search Report for PCT/CN2015/094938 dated Feb. 23, 2016 and its English translation provided by WIPO.
(Continued)

*Primary Examiner* — Jean B Corrielus
(74) *Attorney, Agent, or Firm* — Ladas & Parry, LLP (57) ABSTRACT

A method and a device for configuring and determining a code superposition-based multiuser encoding mode are provided. The configuring method includes steps of: determining, by a network device, UEs by which an identical transmission resource is to be multiplexed; and configuring, by the network device, different columns in a preconfigured encoding matrix formed through multiuser code superposition for the UEs, so as to enable each UE to transmit data in accordance with an encoding mode corresponding to the column configured by the network device, at least two
(Continued)

S11
determining, by a network device, UEs by which an identical transmission resource is to be multiplexed S12
configuring, by the network device, different columns in a preconfigured encoding matrix formed through a multiuser code superposition for the UEs, so as to enable each UE to transmit data in accordance with an encoding mode corresponding to the column configured by the network device, at least two columns in the encoding matrix having different diversity orders columns in the encoding matrix having different diversity orders.

14 Claims, 3 Drawing Sheets

(51) Int. Cl.
    *H04J 13/16*    (2011.01)
    *H04W 72/04*    (2009.01)
    *H04J 11/00*    (2006.01)

(56) References Cited

U.S. PATENT DOCUMENTS

| | | | |
|---|---|---|---|
| 2006/0039499 A1* | 2/2006 | Chae | H04L 1/0625 |
| | | | 375/299 |
| 2006/0072680 A1 | 4/2006 | Wang et al. | |
| 2006/0153312 A1* | 7/2006 | Yun | H04L 1/0606 |
| | | | 375/267 |
| 2006/0203711 A1 | 9/2006 | Oh et al. | |
| 2008/0317104 A1* | 12/2008 | Akcaba | H04B 7/022 |
| | | | 375/211 |
| 2010/0202500 A1* | 8/2010 | Ihm | H04B 7/0417 |
| | | | 375/219 |
| 2010/0303162 A1 | 12/2010 | Wang et al. | |
| 2011/0007828 A1* | 1/2011 | Wang | H04L 1/0058 |
| | | | 375/260 |
| 2011/0064115 A1* | 3/2011 | Xu | H04L 1/0618 |
| | | | 375/130 |

OTHER PUBLICATIONS

Written Opinion of the International Search Authority for PCT/CN2015/094938 dated Feb. 23, 2016 and its English translation provided by WIPO.

International Preliminary Report on Patentability (IPRP; Ch. 1) for PCT/CN2015/094938 dated Jun. 29, 2017 and its English translation provided by WIPO.

From EPO Application No. 15869156.8, Supplementary European Search Report and Search Opinion dated Nov. 30, 2017.

Dai et al: "Successive Interference Cancelation Amenable Multiple Access (SAMA) for Future Wireless Communications". IEEE Nov. 1, 2014, pp. 222-226.

From TW Application No. 104138892, Office Action dated Oct. 21, 2016 with machine English translation from Google.

Saito et al., "Non-Orthogonal Multiple Access (NOMA) for Cellular Future Radio Access", 2013 IEEE, 5 pp.

Li et al., "Performance Evaluation of Non-Orthogonal Multiple Access Combined with Opportunistic Beamforming", 2014 IEEE, 5 pp.

* cited by examiner

METHOD AND DEVICE FOR CONFIGURING AND DETERMINING CODE SUPERPOSITION-BASED MULTIUSER ENCODING MODE

CROSS-REFERENCE TO RELATED APPLICATION

The present application is the U.S. national phase of PCT Application No. PCT/CN2015/094938 filed on Nov. 18, 2015, which claims the priority to the Chinese patent application No. 201410784398.2 filed on Dec. 16, 2014, the disclosures of which are incorporated herein by reference in their entireties.

TECHNICAL FIELD

The present disclosure relates to the field of communication technology, in particular to a method and a device for configuring and determining a code superposition-based multiuser encoding mode.

BACKGROUND

During the mobile communication, it is necessary for all users to share limited wireless resources, so as to enable different users to perform the communication at different locations simultaneously and reduce interference as possible. A multiple-access technique has been presented to achieve this object. Along with the rapid development of the mobile communication technology, there is an explosive growth in the amount of users and services, resulting in more demands on a system capacity of a wireless network. Due to the explosive growth in the amount of users, the multiple-access technique has become a crucial issue for network updating. The multiple-access technique may device a basic capacity of the network, and may significantly affect the system complexity and the deployment cost.

For a mobile communication system in the related art, a multiplexing function for multiple users may be achieved through an orthogonal mode. For example, a Frequency Division Multiple Access (FDMA) technique is adopted by a $1^{st}$-Generation (1G) mobile communication system, a Time Division Multiple Access (TDMA) technique is adopted by a $2^{nd}$-Generation (2G) Global System for Mobile communication (GSM) system, a Code Division Multiple Access (CDMA) technique is adopted by a $3^{rd}$-Generation communication system, and an Orthogonal Frequency Division Multiplexing (OFDM) technique is adopted by a $4^{th}$-Generation (4G) mobile communication system. As an advantage of the orthogonal mode, the interference among the multiple users is relatively small, but as its disadvantage, the capacity may be limited to the number of orthogonal samples.

Sparse Code Multiple Access (SCMA) technique is a superposition technique based on a sparse codebook, i.e., a channel may be further multiplexed by multiple users on an existing time-frequency resource, and the multiple users may be differentiated from each other through a superposed codebook. For the SCMA technique, encoding modes corresponding to different users may have an identical diversity order. However, with respect to a construction method of Low Density Parity Check (LDPC) codes, in the case that the encoding modes corresponding to the multiple users have the same diversity order, it is difficult to improve the multiuser detection performance.

SUMMARY

An object of the present disclosure is to provide a method and a device for configuring and determining a code superposition-based multiuser encoding mode, so as to improve the multiuser detection performance in the SCMA technique where the encoding modes corresponding to different users have an identical diversity order.

The present disclosure provides in some embodiments a method for configuring a code superposition-based multiuser encoding mode, including steps of: determining, by a network device, User Equipments (UEs) by which an identical transmission resource is to be multiplexed; and configuring, by the network device, different columns in a preconfigured encoding matrix formed through a multiuser code superposition for the UEs, to enable each UE to transmit data in accordance with an encoding mode corresponding to the column configured by the network device. At least two columns in the encoding matrix having different diversity orders.

Optionally, the step of configuring, by the network device, different columns in the encoding matrix for the UEs includes: randomly configuring, by the network device, different columns in the preconfigured encoding matrix for the UEs; or configuring, by the network device, different columns in the preconfigured encoding matrix for the UEs in accordance with received power of respective UEs.

Optionally, the step of configuring, by the network device, different columns in the preconfigured encoding matrix for the UEs in accordance with the received power of respective UEs includes: randomly configuring, by the network device, different columns in the preconfigured encoding matrix for the UEs, in the case that a difference between the received power of any two UEs is smaller than or equal to a predetermined power threshold.

Optionally, the step of configuring, by the network device, different columns in the preconfigured encoding matrix for the UEs in accordance with the received power of respective UEs includes: configuring, by the network device, different columns in the preconfigured encoding matrix for the UEs in accordance with a correspondence between the received power of each UE and the diversity order of the column configured for the UE, in the case that a difference between the received power of at least two UEs is greater than a predetermined power threshold.

Optionally, the correspondence is that, a value of the diversity order of the column in the encoding matrix configured by the network device for each UE is in reverse proportion to a value of the received power of the UE.

Optionally, the step of configuring, by the network device, different columns in preconfigured the encoding matrix for the UEs in accordance with the correspondence includes: configuring, by the network device, a column having a smallest diversity order in the preconfigured encoding matrix for the UE having greatest received power among the UEs by which the identical transmission resource is to be multiplexed; or configuring, by the network device, a column having a greatest diversity order in the preconfigured encoding matrix for the UE having smallest received power among the UEs by which the identical transmission resource is to be multiplexed.

Optionally, by the network device, different columns in the preconfigured encoding matrix for the UEs in accordance with the correspondence includes: in the case that the difference between the received power of any two of M UEs in the UEs by which the identical transmission resource is to be multiplexed is smaller than or equal to the predetermined power threshold, determining, by the network device, the diversity orders corresponding to the received power of the M UEs in the preconfigured encoding matrix in accordance with the correspondence; and randomly configuring, by the network device, different columns of M columns corresponding to the diversity orders determined for the M UEs, where M<B, and B represents a quantity of the UEs by which the identical transmission resource is to be multiplexed.

Optionally, the predetermined power threshold is 1/C of an average value of the received power of the UEs by which the identical transmission resource is to be multiplexed, and C is a positive integer.

The present disclosure provides in some embodiments a method for determining a code superposition-based multiuser encoding mode, including steps of: determining, by UEs by which an identical transmission resource is to be multiplexed, columns configured by a network device for the UEs in a preconfigured encoding matrix formed through a multiuser code superposition, at least two columns in the preconfigured encoding matrix having different diversity orders; and transmitting, by each UE, data in accordance with an encoding mode corresponding to the determined column.

The present disclosure provides in some embodiments a network device, including: a determination module configured to determine a plurality of UEs by which an identical transmission resource is to be multiplexed; and a configuration module configured to configure different columns in a preconfigured encoding matrix formed through a multiuser code superposition for the UEs, to enable each UE to transmit data in accordance with an encoding mode corresponding to the column configured by the network device, at least two columns in the preconfigured encoding matrix having different diversity orders.

Optionally, the configuration module is further configured to: randomly configure different columns in the preconfigured encoding matrix for the UEs; or configure different columns in the preconfigured encoding matrix for the UEs in accordance with received power of respective UEs.

Optionally, the configuration module is further configured to randomly configure different columns in the preconfigured encoding matrix for the UEs in the case that a difference between the received power of any two UEs is smaller than or equal to a predetermined power threshold.

Optionally, the configuration module is further configured to configure different columns in the preconfigured encoding matrix for the UEs in accordance with a correspondence between the received power of each UE and the diversity order of the column configured for the UE in the case that a difference between the received power of at least two UEs is greater than a predetermined power threshold.

Optionally, the correspondence is that, a value of the diversity order of the column in the encoding matrix configured by the configuration module for each UE is in reverse proportion to a value of the received power of the UE.

Optionally, the configuration module is further configured to: configure a column having a smallest diversity order in the preconfigured encoding matrix for the UE having greatest received power among the UEs by which the identical transmission resource is to be multiplexed; or configure a column having a greatest diversity order in the encoding matrix for the UE having smallest received power among the UEs by which the identical transmission resource is to be multiplexed.

Optionally, the configuration module is further configured to: in the case that the difference between the received power of any two of M UEs in the UEs by which the identical transmission resource is to be multiplexed is smaller than or equal to the predetermined power threshold, determine the diversity orders corresponding to the received power of the M UEs in the preconfigured encoding matrix in accordance with the correspondence; and randomly configure different columns of M columns corresponding to the determined diversity orders for the M UEs, where M<B, and B represents a quantity of the UEs by which the identical transmission resource is to be multiplexed.

Optionally, the predetermined power threshold is 1/C of an average value of the received power of the UEs by which the identical transmission resource is to be multiplexed, and C is a positive integer.

The present disclosure further provides in some embodiments a UE which multiplexes an identical transmission resource with other UEs, including: an encoding mode determination module configured to determine columns configured by a network device for the UEs in a preconfigured encoding matrix formed through a multiuser code superposition, at least two columns in the preconfigured encoding matrix having different diversity orders; and a data transmission module configured to transmit data in accordance with an encoding mode corresponding to the determined columns.

The present disclosure further provides in some embodiments a network device, including: a memory; a processor configured to read a program stored in the memory, to determine a plurality of UEs by which an identical transmission resource is to be multiplexed; and configure different columns in a preconfigured encoding matrix formed through a multiuser code superposition for the UEs, and notify each UE of the configured column through a transceiver, to enable each UE to transmit data in accordance with an encoding mode corresponding to the column configured by the network device, at least two columns in the preconfigured encoding matrix having different diversity orders; and the transceiver configured to receive and transmit data.

Optionally, the processor is further configured to: randomly configure different columns in the encoding matrix for the UEs; or configure different columns in the encoding matrix for the UEs in accordance with received power of respective UEs.

Optionally, the processor is further configured to, in the case that a difference between the received power of any two UEs is smaller than or equal to a predetermined power threshold, randomly configure different columns in the encoding matrix for the UEs.

Optionally, the processor is further configured to configure different columns in the preconfigured encoding matrix for the UEs in accordance with a correspondence between the received power of each UE and the diversity order of the column configured for the UE, in the case that a difference between the received power of at least two UEs is greater than a predetermined power threshold.

Optionally, the correspondence is that, a value of the diversity order of the column in the encoding matrix configured by the processor for each UE is in reverse proportion to a value of the received power of the UE.

Optionally, the processor is further configured to: configure a column having a smallest diversity order in the preconfigured encoding matrix for the UE having greatest received power among the UEs by which the identical transmission resource is to be multiplexed; or configure a column having a greatest diversity order in the preconfigured encoding matrix for the UE having smallest received power among the UEs by which the identical transmission resource is to be multiplexed.

Optionally, the processor is further configured to: in the case that the difference between the received power of any two of M UEs in the UEs by which the identical transmission resource is to be multiplexed is smaller than or equal to the predetermined power threshold, determine the diversity orders corresponding to the received power of the M UEs in the preconfigured encoding matrix in accordance with the correspondence; and randomly configure different columns of M columns corresponding to the diversity orders determined for the M UEs, where M<B, and B represents a quantity of the UEs by which the identical transmission resource is to be multiplexed.

Optionally, the predetermined power threshold is 1/C of an average value of the received power of the UEs by which the identical transmission resource is to be multiplexed, and C is a positive integer.

The present disclosure further provides in some embodiments a UE which multiplexes an identical transmission resource with other UEs, including: a memory; a processor configured to read a program stored in the memory, so as to: determine columns configured by a network device for the UEs in a preconfigured encoding matrix formed through a multiuser code superposition, at least two columns in the preconfigured encoding matrix having different diversity orders, and transmit data through a transceiver in accordance with an encoding mode corresponding to the determined columns; and the transceiver configured to receive and transmit data.

According to the method and device in the embodiments of the present disclosure, the network device determines the UEs by which the same transmission resource is to be multiplexed, and then configure different columns in the preconfigured encoding matrix formed through multiuser code superposition for the UEs, so as to enable each UE to transmit data in accordance with the encoding mode corresponding to the column configured by the network device. Because at least two columns in the encoding matrix have different diversity orders, the columns in the encoding matrix configured by the network device for the UEs by which the same transmission resource is to be multiplexed may have reasonable, different diversity orders. With respect to a construction method of an LDPC code, in the case that the encoding modes for the UEs by which the same transmission resource is to be multiplexed have the reasonable, different diversity orders, it is able to improve the multiuser detection performance.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the related art, it is merely able for an orthogonal mode to reach an inner bound of a multiuser capacity, so the wireless resource utilization is relatively low. In order to overcome the mentioned detected, a Pattern Division Multiple Access (PDMA) technique has been presented. The PDMA technique is a technique capable of performing joint treatment at both the transmitting end and the receiving end on the basis of optimization of a multiple-user communication system. At the transmitting end, users may be differentiated from each other on the basis of non-orthogonal characteristic patterns for a plurality of signal domains, and at the receiving end, the multiuser detection may be performed in a serial interference cancellation mode on the basis of characteristic structures of user's patterns. In this way, it is able for the users to further multiplex the existing time-frequency wireless resources.

A key of the PDMA technique lies in pattern design at the transmitting end and a serial interference cancellation algorithm at the receiving end. For the pattern design at the transmitting end, a method for designing a code superposition-based multiuser pattern has been presented. To be specific, multiple users may be differentiated from each other through an encoding mode and have reasonable, different diversity orders at the transmitting end (i.e., the encoding modes corresponding to the multiple users have different diversity orders), so as to acquire the identical diversity orders as possible after the reception and detection, thereby to enable the multiple users to multiplex the resources in a simple and efficient manner. For the code superposition-based PDMA technique, its key lies in how to select the appropriate multiple users and how to determine the encoding modes for the multiple users, i.e., how to enable a constructed encoding matrix (also called as PDMA encoding matrix) formed through multiuser code superposition to correspond to the multiple users. Currently, there is scheme for solving this problem. An object of the present disclosure is to provide a method for determining a self-adaptive multiuser encoding mode on the basis of code superposition PDMA technique, so as to provide the different users with reasonable, different diversity orders at the transmitting end in the case of configuring the encoding mode for the multiple users, thereby to enable the multiple users to multiplex the resources in a simple and efficient manner.

The schemes in the embodiments of the present disclosure may be applied to various existing communication systems using an orthogonal multiple access technique, e.g., a Time Division Multiple Access (TDMA) system, a Frequency Division Multiple Access (FDMA) system, a Code Division Multiple Access (CDMA) system, an Orthogonal Frequency-Division Multiple Access (OFDMA) system, or any other similar communication systems.

A network device involved in the embodiments of the present disclosure may be a base station, e.g., a Base Transceiver Station (BTS) in a 2G mobile communication system such as a GSM system, or a NodeB in a 3G mobile communication system such as a Wireless Code-Division Multiple Access (WCDMA)/Time-Division-Synchronous Code-Division Multiple Access (TD-SCDMA)/CDMA2000 system, or an evolved NodeB (eNodeB) in a 4G mobile communication system such as a Long Term Evolution (LTE) system, or a base station a 5G mobile communication system that may occur in future.

A UE involved in the embodiments of the present may be a wireless or wired terminal. The wireless terminal may be a mobile terminal, e.g., a mobile phone (also called as cellular phone) or a computer having the mobile terminal. For example, it may be a portable, pocket-size or handheld mobile device, or a mobile device built in a computer or mounted on a vehicle. It may exchange speech information and/or data with a wireless access network.

The present disclosure will be further described hereinafter in conjunction with the drawings and embodiments.

Figure 1:
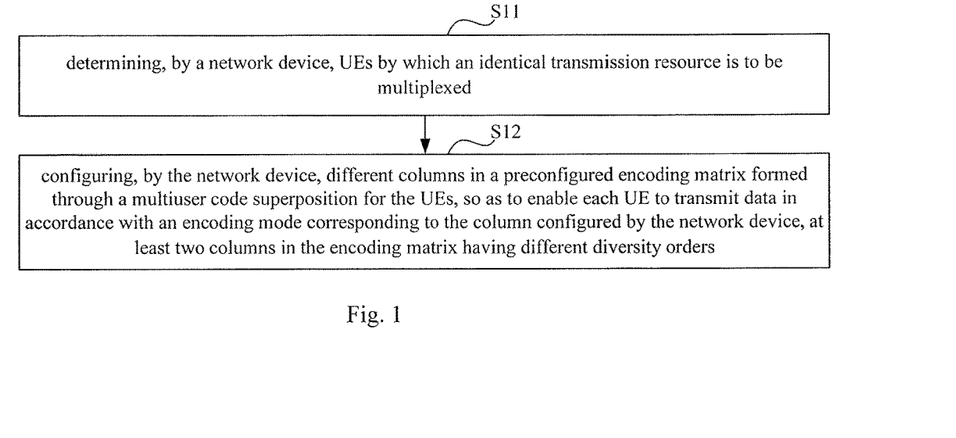
FIG. 1 is a flow chart of a method for configuring a code superposition-based multiuser encoding mode in some embodiments of the present disclosure.

The present disclosure provides in some embodiments a method for configuring a code superposition-based multiuser encoding mode. As shown in FIG. 1, the method includes the following steps.

Step S11: determining, by a network device, UEs by which an identical transmission resource is to be multiplexed.

The transmission resource involved in Step S11 usually refers to a time resource element and/or a frequency resource element. The number of the UEs determined in Step S11 is at least two and greater than the number of the UEs by which the transmission resource is to be multiplexed using a conventional orthogonal multiple access technique. The identical transmission resource refers to the resource element having an identical time and/or frequency.

Step S12: configuring, by the network device, different columns in a preconfigured encoding matrix formed through a multiuser code superposition for the UEs, so as to enable each UE to transmit data in accordance with an encoding mode corresponding to the column configured by the network device, at least two columns in the encoding matrix having different diversity orders.

In some embodiments of the present disclosure, the network device may determine the UEs by which the identical transmission resource is to be multiplexed, and then configure different columns in the preconfigured encoding matrix formed through multiuser code superposition for the UEs, so as to enable each UE to transmit data in accordance with the encoding mode corresponding to the column configured by the network device. At least two columns in the encoding matrix have different diversity orders, so the columns in the encoding matrix configured by the network device for the UEs by which the same transmission resource is to be multiplexed may have reasonable, different diversity orders. With respect to a construction method of an LDPC code, in the case that the encoding modes for the UEs by which the same transmission resource is to be multiplexed have the reasonable, different diversity orders, it is able to improve the multiuser detection performance.

It should be appreciated that, the encoding matrix involved in Step S12 is a preconfigured encoding matrix formed through multiuser code superposition (also called as PDMA encoding matrix), i.e., an encoding matrix formed, based on a code superposition mode, through encoding modes for the multiple UEs by which the identical transmission resource is to be multiplexed. In the multiple UEs by which the identical transmission resource is to be multiplexed, different UEs may use different encoding modes, and these UEs may be differentiates from each other through the encoding modes. Each column in the encoding matrix may correspond to one encoding mode, and at least two columns in the encoding matrix have different diversity orders. In the case that A resource elements (REs) are multiplexed by B UEs, the encoding matrix is an A×B matrix.

Taking a Long Term Evolution (LTE) system as an example, in an orthogonal mode, three REs may be multiplexed by three UEs, and in a code superposition-based non-orthogonal multiple access mode, the three REs may be multiplexed by at most 7 (i.e., $2^3-1$) UEs. Usually, the more the UEs by which the identical RE is to be multiplexed, the more complex the system. Considering the system performance and the complexity, in the case that three REs are multiplexed by 5 UEs, a corresponding encoding matrix (i.e., a PDMA encoding matrix) and its system model may be represented as:

$$H_{PDMA}^{(3,5)} = \begin{bmatrix} 1 & 1 & 1 & 0 & 0 \\ 1 & 1 & 0 & 1 & 0 \\ 1 & 0 & 1 & 0 & 1 \end{bmatrix}_{3\times 5}, \text{ and} \quad (1)$$

$$Y = H_{ch}H_{PDMA}X + N = HX + N, \text{ and} \quad (2)$$

$$\begin{bmatrix} y_1 \\ y_2 \\ y_3 \end{bmatrix} = \begin{bmatrix} h_{1,1} & h_{1,2} & h_{1,3} & 0 & 0 \\ h_{2,1} & h_{2,2} & 0 & h_{2,4} & 0 \\ h_{3,1} & 0 & h_{3,3} & 0 & h_{3,5} \end{bmatrix} \begin{bmatrix} x_1 \\ x_2 \\ x_3 \\ x_4 \\ x_5 \end{bmatrix} + \begin{bmatrix} n_1 \\ n_2 \\ n_3 \end{bmatrix}, \quad (3)$$

where Y represents a received signal vector at a receiving end corresponding to the three REs, y1, y2 and y3 represent received signals at the receiving end corresponding to the three REs respectively, N represents a noise vector at the receiving end corresponding to the three REs, n1, n2 and n3 represent noises at the receiving end corresponding to the three REs respectively, X represents a transmitted signal vector at a transmitting end for the five UEs corresponding to the three REs, x1, x2, . . . , and x5 represent received signals at the transmitting end corresponding to the five UEs, $H_{ch}$ represents a wireless channel response matrix, H represents a PDMA encoding and wireless channel composite response matrix from the transmitting end to the receiving end, $h_{a,b}$ represents encoding and wireless channel composite responses from the transmitting end to the receiving end, a=1, . . . , A, and b=1, . . . , B.

During the implementation, in Step S12, the step of configuring, by the network device, different columns in the encoding matrix for the UEs may include: (1) randomly configuring, by the network device, different columns in the preconfigured encoding matrix for the UEs; or (2) configuring, by the network device, different columns in the preconfigured encoding matrix for the UEs in accordance with received power of respective UEs.

In some embodiments of the present disclosure, in the above mode (2), the step of configuring, by the network device, different columns in the encoding matrix for the UEs in accordance with the received power of each UE includes: in the case that a difference between the received power of any two UEs is smaller than or equal to a predetermined power threshold, randomly configuring, by the network device, different columns in the preconfigured encoding matrix for the UEs; or in the case that the difference between the received power of at least two UEs is greater than the predetermined power threshold, configuring, by the network device, different columns in the preconfigured encoding matrix for the UEs in accordance with a correspondence between the received power of each UE and the diversity order of the column configured for the UE.

Figure 2:
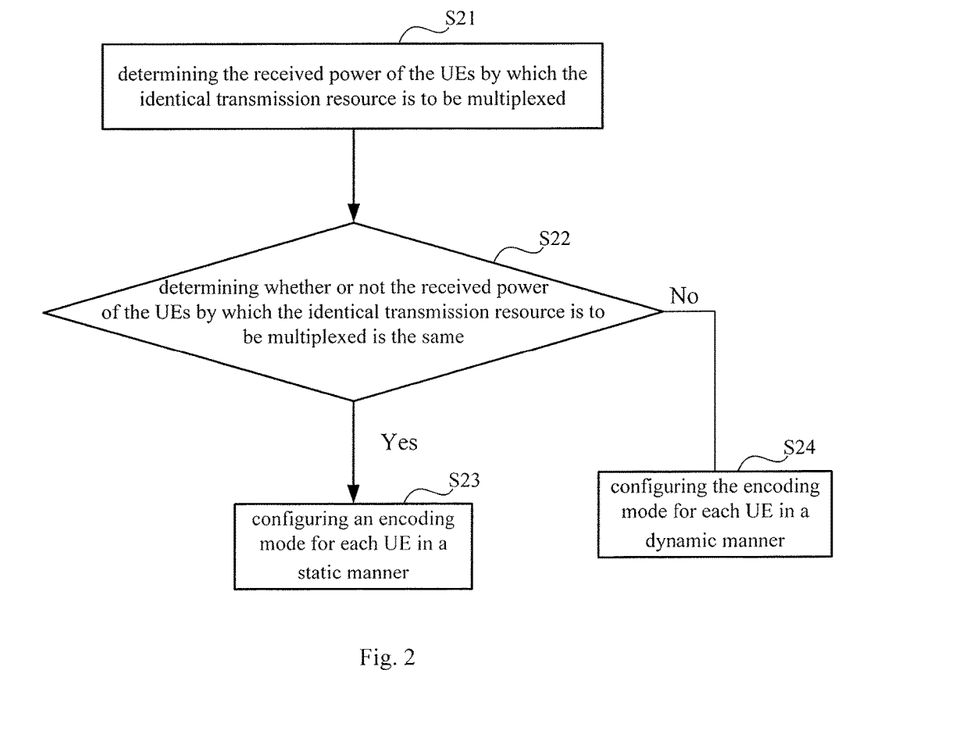
FIG. 2 is a flow chart of a mode 2 in some embodiments of the present disclosure.

As shown in FIG. 2, the method may include: Step S21 of determining, by the network device, the received power of the UEs by which the identical transmission resource is to be multiplexed; Step S22 of determining, by the network device, whether or not the received power of the UEs by which the identical transmission resource is to be multiplexed is the same, i.e., whether or not a difference between the received power of the UEs by which the identical transmission resource is to be multiplexed is smaller than or equal to the predetermined power threshold, in the case that the difference is smaller than or equal to the predetermined power threshold, and proceeding to Step S23 if determining that the received power is the same, or proceeding to Step S24 if determining that the received power is not the same; Step 23 of configuring, by the network device, different columns in the encoding matrix for the UEs in a static manner, i.e., randomly configuring different columns for the UEs in the encoding g matrix; and Step S24 of configuring, by the network device, different columns in the encoding matrix for the UEs in a dynamic manner, i.e., configuring different columns in the encoding matrix for the UEs in accordance with a correspondence between the received power of each UE and the diversity order of the column configured for the UE.

Optionally, the predetermined power threshold (δ) is 1/C of an average value of the received power of the UEs by which the identical transmission resource is to be multiplexed, and C is a positive integer. For example, δ may be ¹⁄₁₀ of the average value of the received power of the UEs by which the identical transmission resource is to be multiplexed.

During the implementation, in the correspondence between the received power of each UE and the diversity order of the column configured for the UE, a value of the diversity order of the column in the encoding matrix configured by the network device for each UE is in reverse proportion to a value of the received power of the UE.

During the implementation, on the basis of the above-mentioned correspondence, the network device may select a column having the smallest diversity order in the encoding matrix for a UE having the greatest received power among the UEs by which the same transmission resource is to be multiplexed; or select a column having the greatest diversity order in the encoding matrix for a UE having the smallest received power among the UEs by which the same transmission resource is to be multiplexed.

During the implementation, on the basis of the above-mentioned correspondence, in the case that the difference between the received power of any two of M UEs in the UEs by which the same transmission resource is to be multiplexed is smaller than or equal to the predetermined power threshold, the network device may determine diversity orders corresponding to the received power of the M UEs in the encoding matrix in accordance with the correspondence, and randomly configure different columns of M columns corresponding to the determined diversity orders for the M UEs, where M<B, and B represents the number of the UEs by which the same transmission resource is to be multiplexed.

In the dynamic mode, the network device may, in accordance with the received power of the UEs by which the identical transmission resource is to be multiplexed, configure the column having a smaller diversity order in the encoding matrix for the UE with strong received power and configure the column having a greater diversity order in the encoding matrix for the UE with weak received power, so as to enable the UEs to transmit the data in accordance with the encoding modes corresponding to the columns configured therefor, thereby to provide the different UEs with reasonable and different diversity orders. Due to the difference in the diversity orders, it is able to improve the detection performance of the UE with weak received power while ensuring the detection performance of the UE with strong received power. In the case that the serial interference cancellation mode is adopted at the receiving end, it is able to improve the entire multiuser detection performance.

For example, three REs are multiplexed by five UEs (i.e., UE1, UE2, UE3, UE4 and UE5) and the preconfigured encoding matrix is a matrix represented by the above-mentioned equation (1). In the case that the above-mentioned mode (2) is adopted, how to acquire the correspondence between the five columns in the equation (1) and five UE identifiers, i.e., x1, x2, . . . and x5 in the above-mentioned equation (3), may depend on the selection of the column in the encoding matrix corresponding to each UE, and the selection may be made in accordance with the received power of the UEs.

In the case that the received power of the five UEs is substantially the same, i.e., $|P_i-P_j| \leq \delta, i \neq j, i,j=1, \ldots, 5$, $\delta$ may be of a very small value, e.g., $\delta=(\frac{1}{10})ave(P_i)$, where $ave(P_i)$ represents an average value of the received power of the five UEs. At this time, the five UEs may correspond to the five UE identifiers x1, x2, . . . , x5 in the equation (3) randomly, i.e., the network device may randomly configure different columns for the UEs by which the identical transmission resource is to be multiplexed. For example, UE1 may correspond to x1 (i.e., a first column), UE2 may correspond to x2 (i.e., a second column), UE3 may correspond to x3 (i.e., a third column), UE4 may correspond to x4 (i.e., a fourth column), and UE5 may correspond to x5 (i.e., a fifth column). This encoding mode for multiple UEs is called as a static mode.

In the case that the received power of the five UEs is not substantially the same (even in the case that the five UEs are grouped in accordance with a certain rule required by power difference), i.e., $|P_i-P_j| \gg \delta, i \neq j, i,j=1, \ldots, 5$, the network device needs to match the five UEs with the five UE identifiers x1, x2, . . . , x5 in the equation (3) in accordance with a certain rule (i.e., the correspondence), so as to select the columns in the encoding matrix for the five UEs. The rule lies in that, a column having a small diversity order is selected for the UE with strong received power, a column having a great diversity order is selected for the UE with weak received power, and columns having an identical or similar diversity order are selected for the UEs with similar received power. For example, the received power of the five UEs may be ranked (e.g., $P_3 \geq P_2 \geq P_5 \geq P_1 > P_4$, i.e., UE3 has the strongest received power and UE 4 has the weakest received power), UE4 may correspond to x1 (i.e., the first column), UE1 and UE5 may correspond to x2 and x3 (i.e., the second and third columns) respectively, and UE2 and UE3 may correspond to x4 and x5 (i.e., the fourth and fifth columns) respectively. This encoding mode for multiple UEs is called as a dynamic mode. Through the dynamic mode, it is able to ensure that, at the transmitting end, UE4 with the weakest received power has the largest diversity order 3, and UE3 with the strongest received power has the smallest diversity order 1, i.e., it is able to provide the UEs with reasonable and different diversity orders in accordance with the received power.

Figure 3:
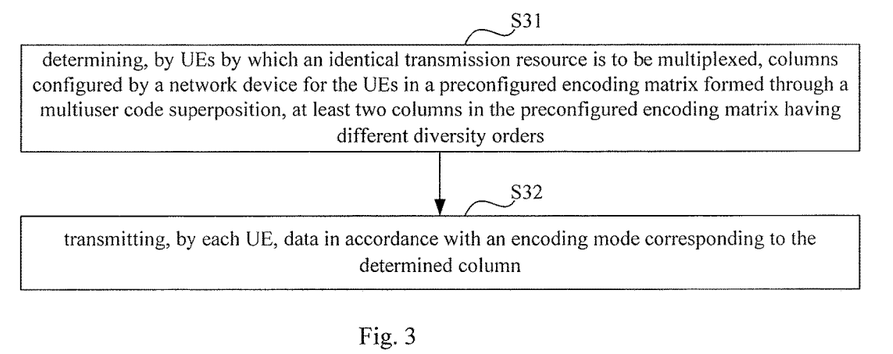
FIG. 3 is a flow chart of a method for determining a code superposition-based multiuser encoding mode in some embodiments of the present disclosure.

Based on an identical inventive concept, the present disclosure provides in some embodiments a method for determining a code superposition-based multiuser encoding mode. As shown in FIG. 3, the method includes: Step S31 of determining, by UEs by which an identical transmission resource is to be multiplexed, columns configured by a network device for the UEs in a preconfigured encoding matrix formed through a multiuser code superposition, at least two columns in the preconfigured encoding matrix having different diversity orders; and Step S32 of transmitting, by each UE, data in accordance with an encoding mode corresponding to the determined column.

According to the method in the embodiments of the present disclosure, the UEs by which the identical transmission resource is to be multiplexed may transmit the data in accordance with the encoding modes configured by the network device for them. The columns in the encoding matrix configured by the network device for the UEs by which the same transmission resource is to be multiplexed may have reasonable, different diversity orders. With respect to a construction method of an LDPC code, in the case that the encoding modes for the UEs by which the same transmission resource is to be multiplexed have the reasonable, different diversity orders, it is able to improve the multiuser detection performance.

The steps of the method may be implemented by a software program which may be stored in a storage medium. The software program may be called so as to execute the above-mentioned steps.

Figure 4:
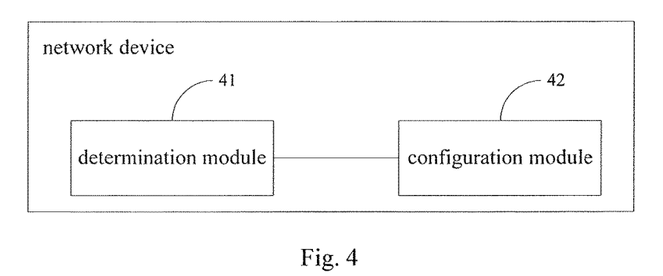
FIG. 4 is a schematic view showing a network device in some embodiments of the present disclosure.

Based on an identical inventive concept, the present disclosure further provides in some embodiments a network device which, as shown in FIG. 4, includes: a determination module 41 configured to determine a plurality of UEs by which an identical transmission resource is to be multiplexed; and a configuration module 42 configured to configure different columns in a preconfigured encoding matrix formed through a multiuser code superposition for the UEs, so as to enable each UE to transmit data in accordance with an encoding mode corresponding to the column configured by the network device, at least two columns in the preconfigured encoding matrix having different diversity orders.

During the implementation, the configuration module 42 is further configured to: randomly configure different columns in the preconfigured encoding matrix for the UEs; or configure different columns in the preconfigured encoding matrix for the UEs in accordance with received power of respective UEs.

Optionally, the configuration module 42 is further configured to, in the case that a difference between the received power of any two UEs is smaller than or equal to a predetermined power threshold, randomly configure different columns in the encoding matrix for the UEs.

Optionally, the configuration module 42 is further configured to, in the case that a difference between the received power of at least two UEs is greater than the predetermined power threshold, configure different columns in the preconfigured encoding matrix for the UEs in accordance with a correspondence between the received power of each UE and the diversity order of the column configured for the UE.

Optionally in the correspondence, a value of the diversity order of the column in the encoding matrix configured by the configuration module 42 for each UE is in reverse proportion to a value of the received power of the UE.

Based on the above-mentioned correspondence, the configuration module 42 is further configured to: configure a column having a smallest diversity order in the preconfigured encoding matrix for the UE having greatest received power among the UEs by which the identical transmission resource is to be multiplexed; or configure a column having a greatest diversity order in the encoding matrix for the UE having smallest received power among the UEs by which the identical transmission resource is to be multiplexed.

Based on the above-mentioned correspondence, the configuration module 42 is further configured to: in the case that the difference between the received power of any two of M UEs in the UEs by which the identical transmission resource is to be multiplexed is smaller than or equal to the predetermined power threshold, determine the diversity orders corresponding to the received power of the M UEs in the preconfigured encoding matrix in accordance with the correspondence; and randomly configure different columns of M columns corresponding to the determined diversity orders for the M UEs, where M<B, and B represents a quantity of the UEs by which the same transmission resource is to be multiplexed.

Optionally, the predetermined power threshold is 1/C of an average value of the received power of the UEs by which the same transmission resource is to be multiplexed, and C is a positive integer.

Figure 5:
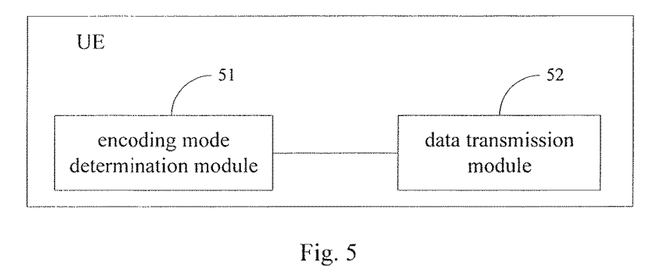
FIG. 5 is a schematic view showing a UE in some embodiments of the present disclosure.

Based on an identical inventive concept, the present disclosure further provides in some embodiments a UE which multiplexes an identical transmission resource with other UEs. As shown in FIG. 5, the UE includes: an encoding mode determination module 51 configured to determine columns configured by a network device for the UEs in a preconfigured encoding matrix formed through a multiuser code superposition, at least two columns in the preconfigured encoding matrix having different diversity orders; and a data transmission module 52 configured to transmit data in accordance with an encoding mode corresponding to the determined columns.

Figure 6:
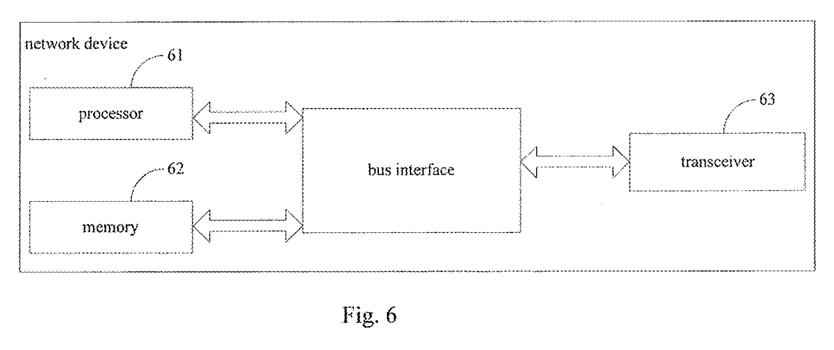
FIG. 6 is another schematic view showing the network device in some embodiments of the present disclosure.

Based on an identical inventive concept, the present disclosure further provides in some embodiments a network device which, as shown in FIG. 6, includes: a memory 62; a processor 61 configured to read a program stored in the memory 62, so as to: determine a plurality of UEs by which an identical transmission resource is to be multiplexed; and configure different columns in a preconfigured encoding matrix formed through a multiuser code superposition for the UEs, and notify each UE of the configured column through a transceiver 63, so as to enable each UE to transmit data in accordance with an encoding mode corresponding to the column configured by the network device, at least two columns in the preconfigured encoding matrix having different diversity orders; and the transceiver 63 configured to receive and transmit data under the control of the processor 61.

In FIG. 6, bus architecture may include a number of buses and bridges connected to each other, so as to connect various circuits for one or more processors 61 and one or more memories 62. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 63 may consist of one element, or more than one elements, e.g., transmitters and receivers for communication with any other devices over a transmission medium. The processor 61 may take charge of managing the bus architecture as well general processings. The memory 62 may store therein data for the operation of the processor 61.

During the implementation, the processor 61 is further configured to: randomly configure different columns in the encoding matrix for the UEs; or configure different columns in the encoding matrix for the UEs in accordance with received power of respective UEs.

Optionally, the processor 61 is further configured to, in the case that a difference between the received power of any two UEs is smaller than or equal to a predetermined power threshold, randomly configure different columns in the encoding matrix for the UEs.

Optionally, the processor 61 is further configured to, in the case that the difference between the received power of at least two UEs is greater than the predetermined power threshold, configure different columns in the encoding matrix for the UEs in accordance with a correspondence between the received power of respective UEs and the diversity order of the configured column.

Optionally, in the correspondence, a value of the diversity order of the column in the encoding matrix configured by the processor 61 for each UE is in reverse proportion to a value of the received power of the UE.

Based on the above-mentioned correspondence, the processor 61 is further configured to: configure a column having a smallest diversity order in the preconfigured encoding matrix for the UE having greatest received power among the UEs by which the identical transmission resource is to be multiplexed; or configure a column having a greatest diversity order in the preconfigured encoding matrix for the UE having smallest received power among the UEs by which the identical transmission resource is to be multiplexed.

Based on the above-mentioned correspondence, the processor 61 is further configured to: in the case that the difference between the received power of any two of M UEs in the UEs by which the same transmission resource is to be multiplexed is smaller than or equal to the predetermined power threshold, determine diversity orders corresponding to the received power of the M UEs in the encoding matrix in accordance with the correspondence; and randomly configure different columns of M columns corresponding to the determined diversity orders for the M UEs, where M<B, and B represents the number of the UEs by which the same transmission resource is to be multiplexed.

Optionally, the predetermined power threshold is 1/C of an average value of the received power of the UEs by which the same transmission resource is to be multiplexed, and C is a positive integer.

Figure 7:
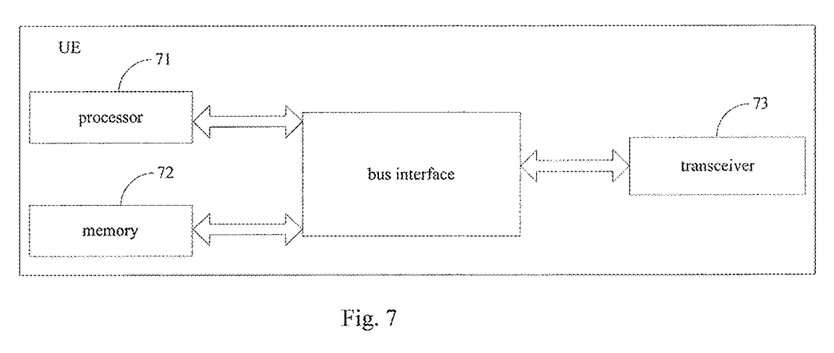
FIG. 7 is another schematic view showing the UE in some embodiments of the present disclosure.

Based on an identical inventive concept, the present disclosure further provides in some embodiments a UE which multiplexes an identical transmission resource with other UEs. As shown in FIG. 7, the UE includes: a memory 72; a processor 71 configured to read a program stored in the memory, so as to: determine columns configured by a network device for the UEs in a preconfigured encoding matrix formed through a multiuser code superposition, at least two columns in the preconfigured encoding matrix having different diversity orders, and transmit data through a transceiver 73 in accordance with an encoding mode corresponding to the determined columns; and the transceiver 73 configured to receive and transmit data under the control of the processor 71.

In FIG. 7, bus architecture may include a number of buses and bridges connected to each other, so as to connect various circuits for one or more processors 71 and one or more memories 72. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 73 may consist of one element, or more than one elements, e.g., transmitters and receivers for communication with any other devices over a transmission medium. The processor 71 may take charge of managing the bus architecture as well general processings. The memory 72 may store therein data for the operation of the processor 71.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure are described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The embodiments of the apparatus and the method thereof have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats. Any module or unit in the embodiments of the present disclosure may be implemented mechanically or electronically. For example, one module may include a permanent circuit or a logic element for a specific operation. The module may also include a programmable logic element or circuit (e.g., a general-purpose processor or any other programmable processors) configured temporarily by the software, so as to perform the specific operation. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

Although the preferred embodiments are described above, a person skilled in the art may make modifications and alterations to these embodiments in accordance with the basic concept of the present disclosure. Therefore, the attached claims are intended to include the preferred embodiments and all of the modifications and alterations that fall within the scope of the present disclosure.

Obviously, a person skilled in the art may make further modifications and improvements without departing from the principle of the present disclosure, and these modifications and improvements shall also fall within the scope of the present disclosure.

What is claimed is:

1. A method for configuring a code superposition-based multiuser encoding mode, comprising:
   determining, by a network device, User Equipments (UEs) by which an identical transmission resource is to be multiplexed; and
   configuring, by the network device, different columns in a preconfigured encoding matrix formed through a multiuser code superposition for the UEs, to enable each UE to transmit data in accordance with an encoding mode corresponding to one of the columns configured by the network device, at least two columns in the encoding matrix having different diversity orders;
   wherein the configuring, the network device, different columns in the preconfigured encoding matrix for the UEs comprises: randomly configuring, by the network device, the different columns in the preconfigured encoding matrix for the UEs; or configuring, by the network device, the different columns in the preconfigured encoding matrix for the UEs in accordance with received power of respective UEs.

2. The method according to claim 1, wherein the configuring, by the network device, different columns in the preconfigured encoding matrix for the UEs in accordance with the received power of respective UEs comprises: randomly configuring, by the network device, the different columns in the preconfigured encoding matrix for the UEs, in the case that a difference between the received power of any two UEs is smaller than or equal to a predetermined power threshold.

3. The method according to claim 1, wherein the configuring, by the network device, different columns in the preconfigured encoding matrix for the UEs in accordance with the received power of respective UEs comprises: configuring, by the network device, the different columns in the preconfigured encoding matrix for the UEs in accordance with a correspondence between the received power of the UEs and the diversity orders of the columns configured for the UEs, in the case that a difference between the received power of at least two UEs is greater than a predetermined power threshold.

4. The method according to claim 3, wherein the correspondence is that a value of the diversity order of each column in the encoding matrix configured by the network device for each UE is in reverse proportion to a value of the received power of the each UE.

5. The method according to claim 4, wherein the configuring, by the network device, different columns in the preconfigured encoding matrix for the UEs in accordance with the correspondence comprises: configuring, by the network device, a column having a smallest diversity order in the preconfigured encoding matrix for a UE having greatest received power among the UEs by which the identical transmission resource is to be multiplexed; or configuring, by the network device, a column having a greatest diversity order in the preconfigured encoding matrix for a UE having smallest received power among the UEs by which the identical transmission resource is to be multiplexed.

6. The method according to claim 4, wherein the configuring, by the network device, different columns in the preconfigured encoding matrix for the UEs in accordance with the correspondence comprises: in the case that the difference between the received power of any two of M UEs in the UEs by which the identical transmission resource is to be multiplexed is smaller than or equal to the predetermined power threshold, determining, by the network device, the diversity orders corresponding to the received power of the M UEs in the preconfigured encoding matrix in accordance with the correspondence; and randomly configuring, by the network device, different columns of M columns corresponding to the diversity orders determined for the M UEs, wherein M<B, and B represents a quantity of the UEs by which the identical transmission resource is to be multiplexed.

7. The method according to claim 2, wherein the predetermined power threshold is 1/C of an average value of the received power of the UEs by which the identical transmission resource is to be multiplexed, and C is a positive integer.

8. A network device, comprising:
   a memory;
   a processor configured to read a program stored in the memory, to
   determine a plurality of User Equipments (UEs) by which an identical transmission resource is to be multiplexed; and configure different columns in a preconfigured encoding matrix formed through a multiuser code superposition for the UEs, and notify each UE of the configured column through a transceiver, to enable each UE to transmit data in accordance with an encoding mode corresponding to one of the columns configured by the network device, wherein at least two columns in the preconfigured encoding matrix have different diversity orders; and the transceiver configured to receive and transmit data;

wherein the processor is configured to read the program stored in the memory, to randomly configure the different columns in the preconfigured encoding matrix for the UEs; or configure the different columns in the preconfigured encoding matrix for the UEs in accordance with received power of respective UEs.

9. The network device according to claim 8, wherein the processor is configured to read the program stored in the memory, to randomly configure the different columns in the preconfigured encoding matrix for the UEs in the case that a difference between the received power of any two UEs is smaller than or equal to a predetermined power threshold.

10. The network device according to claim 8, wherein the processor is configured to read the program stored in the memory, to configure the different columns in the preconfigured encoding matrix for the UEs in accordance with a correspondence between the received power of the UEs and the diversity orders of the columns configured for the UEs in the case that a difference between the received power of at least two UEs is greater than a predetermined power threshold.

11. The network device according to claim 10, wherein the correspondence is that a value of the diversity order of each column in the encoding matrix configured by the processor for each UE is in reverse proportion to a value of the received power of the each UE.

12. The network device according to claim 11, wherein the processor is configured to read the program stored in the memory, to configure a column having a smallest diversity order in the preconfigured encoding matrix for a UE having greatest received power among the UEs by which the identical transmission resource is to be multiplexed; or configure a column having a greatest diversity order in the encoding matrix for a UE having smallest received power among the UEs by which the identical transmission resource is to be multiplexed.

13. The network device according to claim 11, wherein the processor is configured to read the program stored in the memory, to in the case that the difference between the received power of any two of M UEs in the UEs by which the identical transmission resource is to be multiplexed is smaller than or equal to the predetermined power threshold, determine the diversity orders corresponding to the received power of the M UEs in the preconfigured encoding matrix in accordance with the correspondence; and randomly configure different columns of M columns corresponding to the determined diversity orders for the M UEs, wherein M<B, and B represents a quantity of the UEs by which the identical transmission resource is to be multiplexed.

14. The network device according to claim 9, wherein the predetermined power threshold is 1/C of an average value of the received power of the UEs by which the identical transmission resource is to be multiplexed, and C is a positive integer.

* * * * *